United States Patent
Ha et al.

(10) Patent No.: US 12,181,648 B2
(45) Date of Patent: *Dec. 31, 2024

(54) IMAGE COMPENSATION DEVICE FOR IMAGE FOR AUGMENTED REALITY

(71) Applicant: LETINAR CO., LTD, Anyang-si (KR)

(72) Inventors: Jeong Hun Ha, Seoul (KR); Soon Gi Park, Seoul (KR)

(73) Assignee: LETINAR CO., LTD, Anyang-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/434,548

(22) Filed: Feb. 6, 2024

(65) Prior Publication Data

US 2024/0176121 A1    May 30, 2024

Related U.S. Application Data

(63) Continuation of application No. 18/016,300, filed as application No. PCT/KR2021/007525 on Jun. 16, 2021, now Pat. No. 11,927,733.

(30) Foreign Application Priority Data

Jul. 24, 2020  (KR) .................. 10-2020-0092083

(51) Int. Cl.
  *G09G 5/00*    (2006.01)
  *G02B 17/00*   (2006.01)
  (Continued)

(52) U.S. Cl.
  CPC ....... *G02B 17/002* (2013.01); *G02B 27/0172* (2013.01); *G02B 27/0179* (2013.01);
  (Continued)

(58) Field of Classification Search
  CPC .. G02B 17/002; G02B 27/01; G02B 27/0172; G02B 27/0179; G02B 2027/011;
  (Continued)

(56) References Cited

U.S. PATENT DOCUMENTS 5,664,858 A    9/1997  Woo
5,795,046 A    8/1998  Woo
(Continued)

FOREIGN PATENT DOCUMENTS

JP    2006133439 A    5/2006
JP    2017223825 A    12/2017
(Continued)

*Primary Examiner* — Joe H Cheng
(74) *Attorney, Agent, or Firm* — Rabin & Berdo, P.C.

(57) ABSTRACT

The present invention relates to an image compensation device for an image for augmented reality. The image compensation device includes: a compensation function determination unit configured to determine a compensation function for compensating the luminance information of an observed image observed by a user through an optical device for augmented reality when an original image for augmented reality is output from an image output unit; and a pre-compensated image information generation unit configured to generate pre-compensated image information for augmented reality based on the compensation function determined by the compensation function determination unit and original image information for augmented reality. The image output unit outputs pre-compensated augmented reality image light corresponding to the pre-compensated image information for augmented reality, and the plurality of reflective units transfer the pre-compensated augmented reality image light to the pupil of the user by reflecting the pre-compensated augmented reality image light.

17 Claims, 11 Drawing Sheets

(51) Int. Cl.
    *G02B 27/01*     (2006.01)
    *G06F 3/01*     (2006.01)
    *G06T 7/50*     (2017.01)

(52) U.S. Cl.
    CPC ............. *G06F 3/013* (2013.01); *G06T 7/50* (2017.01); *G02B 2027/0178* (2013.01); *G02B 2027/0187* (2013.01)

(58) Field of Classification Search
    CPC .... G02B 2027/0178; G02B 2027/0187; G06F 3/011; G06F 3/013; G06T 5/00; G06T 7/50; G06T 19/006
    See application file for complete search history.

(56) References Cited

U.S. PATENT DOCUMENTS

| | | | |
|---|---|---|---|
| 10,847,119 | B2 | 11/2020 | Kim et al. |
| 11,500,143 | B2 * | 11/2022 | Danziger ............... G02C 7/061 |
| 11,927,733 | B2 * | 3/2024 | Ha ..................... G06F 3/011 |
| 2003/0071826 | A1 | 4/2003 | Goertzen |
| 2008/0062164 | A1 | 3/2008 | Bassi et al. |
| 2012/0281721 | A1 | 11/2012 | Dejong |
| 2021/0132270 | A1 | 5/2021 | Ha |
| 2022/0026735 | A1 | 1/2022 | Ha |
| 2022/0171191 | A1 | 6/2022 | Ha |

FOREIGN PATENT DOCUMENTS

| | | |
|---|---|---|
| KR | 10-1660519 B1 | 9/2016 |
| KR | 10-2099785 B1 | 4/2020 |
| KR | 10-2020-0048386 A | 5/2020 |
| KR | 10-2020-0052251 A | 5/2020 |
| KR | 10-2020-0079764 A | 7/2020 |
| WO | 2019220386 A1 | 11/2019 |
| WO | 2020084954 A1 | 4/2020 |

\* cited by examiner

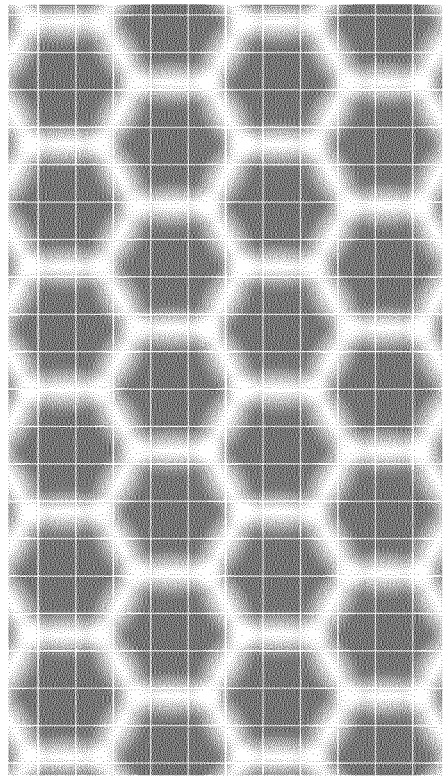
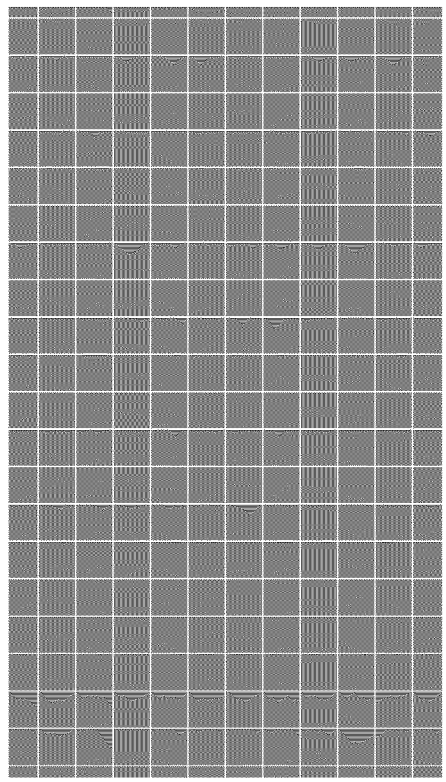
FIG. 4

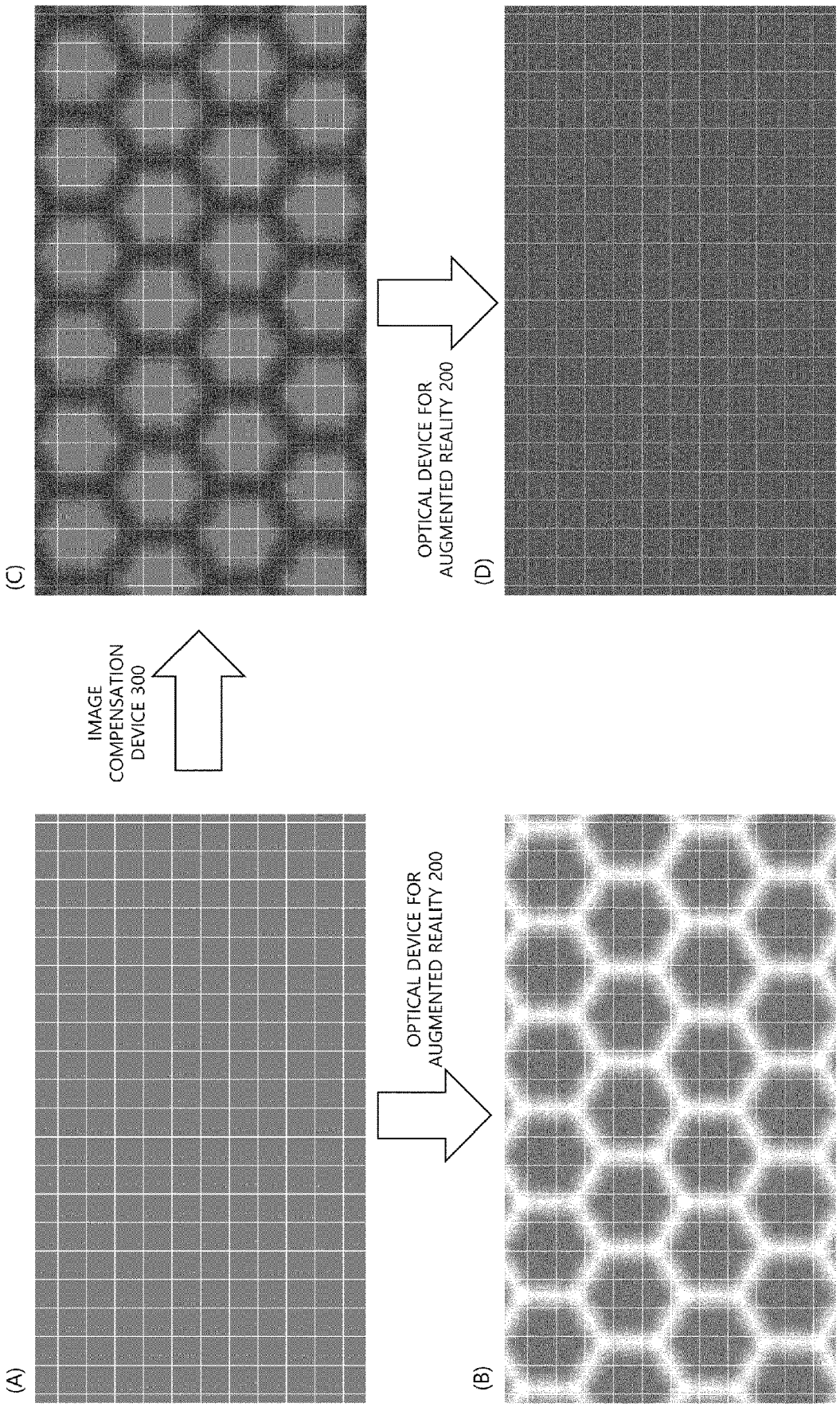

IMAGE COMPENSATION DEVICE FOR IMAGE FOR AUGMENTED REALITY

This application is a continuation of U.S. application Ser. No. 18/016,300, filed on Jan. 13, 2023, now U.S. Pat. No. 11,927,733 B2, which is the National Stage of PCT/KR2021/007525 filed on Jun. 16, 2021, which claims priority under 35 U.S.C. § 119 of Korean Application No. KR 10-2020-0092083 filed on Jul. 24, 2020, the disclosure of which is incorporated by reference.

TECHNICAL FIELD

The present invention relates to an image compensation device for an image for augmented reality, and more particularly to an image compensation device for an image for augmented reality that is capable of providing an image for augmented reality having a uniform luminance distribution.

BACKGROUND ART

Augmented reality (AR) refers to technology that superimposes a virtual image, provided by a computer or the like, on a real image in the real world and then provides a resulting image, as is well known.

In order to implement augmented reality, there is required an optical system that allows a virtual image, generated by a device such as a computer, to be superimposed on an image in the real world and then allows a resulting image to be provided. As such an optical system, there is known a technology using an optical means such as a prism for reflecting or refracting a virtual image by using a head-mounted display (HMD) or a glasses-type device.

However, devices using the conventional optical system have problems in that it is inconvenient for users to wear them because the configurations thereof are complicated and thus the weights and volumes thereof are considerable and in that the manufacturing costs thereof are high because the manufacturing processes thereof are also complicated.

Furthermore, the conventional devices have a limitation in that a virtual image becomes out of focus when a user changes focal length when gazing at the real world. To overcome this problem, there have been proposed technologies such as a prism capable of adjusting focal length for a virtual image and a variable focal lens being controlled electrically in response to a change in focal length. However, these technologies also have a problem in that a user needs to perform a separate operation in order to adjust focal length or in that hardware such as a separate processor and software for controlling focal length are required.

In order to overcome the above-described problems of the conventional technologies, the present applicant has developed a device capable of implementing augmented reality by projecting a virtual image onto the retina through the pupil using a reflective unit having a size smaller than that of a human pupil, as described in patent document 1.

FIG. 1 is a diagram showing an optical device 100 for augmented reality such as that disclosed in patent document 1 that was filed for a patent application by the present applicant.

The optical device 100 for augmented reality of FIG. 1 includes an optical means 10, a reflective unit 20, an image output unit 30, and a frame unit 40.

The optical means 10 is a means for transmitting at least part of real object image light, which is image light output from a real object, therethrough, and may be, e.g., a lens of eyeglasses. The reflective unit 20 is disposed to be embedded inside the optical means 10. Furthermore, the optical means 10 also functions to transmit the augmented reality image light, output from the image output unit 30 and reflected by the reflective unit 20, therethrough in order to transfer the augmented reality image light to the pupil.

The frame unit 40 is a means for fixing and supporting both the image output unit 30 and the optical means 10, and may be, e.g., an eyeglass frame.

The image output unit 30 is a means for outputting augmented reality image light, which is image light corresponding to an image for augmented reality. For example, the image output unit 30 may include a small display device configured to display an image for augmented reality on a screen and radiate augmented reality image light, and a collimator configured to collimate the image light, radiated from the display device, into parallel light.

The reflective unit 20 reflects image light corresponding to an image for augmented reality, output from the image output unit 30, toward a pupil of a user, thereby enabling the user to view the image for augmented reality.

The reflective unit 20 of FIG. 1 is formed to have a size equal to or smaller than that of the average pupil of people, i.e., 8 mm or less. By forming the reflective unit 20 to be smaller than the average pupil as described above, the depth of field for light entering the pupil through the reflective unit 20 may be made almost infinite, i.e., considerably deep.

In this case, the depth of field refers to a range within which an image for augmented reality is recognized as being in focus. When the depth of field increases, a focal distance for an image for augmented reality get increased. Accordingly, even when a user changes the focal distance for the real world while gazing at the real world, the user always recognizes an image for augmented reality as being in focus regardless of such a change. This may be viewed as a type of pinhole effect. Accordingly, even when the user changes the focal length while gazing at a real object present in the real world, the user can always view a clear virtual image for an image for augmented reality.

FIGS. 2 and 3 are views showing an optical device 200 for augmented reality in which a plurality of reflective units 20 are disposed, in which FIG. 2 is a side view of the optical device 200 for augmented reality and FIG. 3 is a front view of the optical device 200 for augmented reality.

The optical device of FIGS. 2 and 3 is basically the same as the optical device 100 for augmented reality of FIG. 1, but is different from the optical device 100 for augmented reality of FIG. 1 in that the plurality of reflective units 20 are arranged in the form of an array in order to provide a wider viewing angle.

In other words, the reflective units 20 are arranged in the form of a 4×9 array in the optical device 200 for augmented reality of FIGS. 2 and 3. The reflective units 20 are arranged such that reflective units 20 that constitute lower rows when the optical device 200 for augmented reality is viewed from a side thereof are located closer to the pupil 50, as shown in FIG. 2, so that the individual reflective units 20 can receive an image for augmented reality output from an image output unit 30.

The image output unit 30 receives augmented reality image information adapted to allow the image output unit 30 to display an augmented reality image output from an image playback device (not shown) such as a computer or a smartphone, and transfers augmented reality image light corresponding to the augmented reality image information to the plurality of reflective units 20 by outputting the augmented reality image light.

The plurality of reflective units 20 transfer the augmented reality image light, output from the image output unit 30, to the pupil 50 of an eye of a user by reflecting the augmented reality image light, thereby providing an augmented reality image corresponding to the augmented reality image light to the user.

The optical device 200 for augmented reality having the plurality of reflective units 20 has the advantage of providing a wider viewing angle, but has a problem in that the luminance distribution of an image for augmented reality provided to a user is not uniform.

FIG. 4 shows views illustrating a problem in which the luminance distribution of an image for augmented reality observed by a user through the optical device 200 for augmented reality of FIGS. 2 and 3 is not uniform.

FIG. 4(A) shows a screen in the state in which an image for augmented reality is displayed in the image output unit 30, and FIG. 4(B) shows an image for augmented reality, which is an observed image in the case where a user observes the image for augmented reality of FIG. 4(A) through the optical device 200 for augmented reality. It should be noted that in FIG. 4, the contrast of a screen is somewhat exaggerated to illustrate the principle of the present invention.

As shown in FIG. 4(A), an image for augmented reality having a uniform luminance distribution is displayed on the display unit of the image output unit 30. However, when the image for augmented reality is transferred to the pupil 50 through the plurality of reflective units 20, the user observes an image having a non-uniform luminance distribution as shown in FIG. 4(B).

The portions shown in white in FIG. 4(B) are areas that appear brighter than their surrounding areas due to the light reflected from adjacent reflective units 20.

The non-uniformity of luminance distribution is related to the shape, size, and arrangement structure of the reflective units 20, the diameter of the pupil, an eye relief (the distance between the pupil and the reflective units 20), the focal position of the eyeball, the lateral position of the eyeball, and/or the like.

Therefore, in the optical device 200 for augmented reality using the plurality of reflective units 20, a problem may arise in that an image for augmented reality finally observed by a user is unclear or unsharp due to the non-uniformity of luminance distribution.

Patent Document 1

Korean Patent No. 10-1660519 (published on Sep. 29, 2016)

DISCLOSURE

Technical Problem

In order to overcome the above problems, an object of the present invention is to provide an image compensation device for an image for augmented reality that pre-compensates the luminance distribution information of an image for augmented reality in advance to overcome the problem of a non-uniform luminance distribution in an optical device for augmented reality that provides an image for augmented reality by using a plurality of reflective units, thus being capable of providing an image for augmented reality having a uniform luminance distribution.

Technical Solution

In order to accomplish the above object, the present invention provides an image compensation device for an image for augmented reality, the image compensation device being combined with an optical device for augmented reality that includes: an image output unit configured to output augmented reality image light corresponding to an image for augmented reality; an optical means configured to transmit at least part of real object image light, which is image light output from a real object, therethrough toward a pupil of a user; and a plurality of reflective units disposed inside the optical means, and configured to transfer the augmented reality image light, output from the image output unit, to the pupil of the user by reflecting the augmented reality image light, the image compensation device including: a compensation function determination unit configured to determine a compensation function for compensating the luminance information of an observed image observed by the user through the optical device for augmented reality when an original image for augmented reality is output from the image output unit; and a pre-compensated image information generation unit configured to generate pre-compensated image information for augmented reality based on the compensation function determined by the compensation function determination unit and original image information for augmented reality; wherein the image output unit outputs pre-compensated augmented reality image light corresponding to the pre-compensated image information for augmented reality generated by the pre-compensated image information generation unit, and the plurality of reflective units transfer the pre-compensated augmented reality image light, output from the image output unit, to the pupil of the user by reflecting the pre-compensated augmented reality image light.

In this case, the compensation function determination unit may determine the compensation function by the following formula:

$$\frac{\alpha}{M(x, y) * P(x, y) * PSF(x, y)}$$

where $\alpha$ is a scaling factor, $M(x,y)$ is the shape function of the reflective units, $P(x,y)$ is the array function of the reflective units, $PSF(x,y)$ is an eye point spread function (PSF), and $*$ is a convolution operator.

Furthermore, the shape function $M(x,y)$ of the reflective units may be determined by:

$$M(x, y) = Circ\left(\frac{\sqrt{x^2 + y^2}}{r}\right)$$

where x and y refer to coordinate values when the plane on which the reflective units are arranged or the retina is represented in a two-dimensional coordinate system, r is the radius of the reflective units, and $$Circ\left(\frac{x^2 + y^2}{r}\right)$$

is 1 when it is smaller than r, and has 0 otherwise.

Furthermore, the array function $P(x,y)$ of the reflective units may be a function representing the positions of the centers of the plurality of reflective units.

Furthermore, the array function $P(x,y)$ of the reflective units may be determined by the following equation:

$$P(x, y) = \sum_{j=0}^{h-1} \sum_{i=0}^{w-1} \delta(x - w_h i, y - w_v j)$$

where h is the number of reflective units in the lateral direction, w is the number of reflective units in the vertical direction, $w_h$ is the interval between the reflective units in the lateral direction, $w_v$ is the interval between the reflective units in the vertical direction, $\delta$ is a Dirac delta function, and x and y are the coordinate values of each of the reflective units when the plane on which the reflective units are arranged is represented in a two-dimensional coordinate system.

Furthermore, the array function P(x,y) of the reflective units may be determined by the following equation:

$$P(x, y) = \sum_{j=0}^{\frac{h-1}{2}} \sum_{i=0}^{w-1} \delta(x - w_h i, y - 2w_v j) + \sum_{j=0}^{\frac{h-1}{2}} \sum_{i=0}^{w-1} \delta\left(x - w_h i - \frac{w_h}{2}, y - 2w_v j - w_v\right)$$

where h is the number of reflective units in the lateral direction, w is the number of reflective units in the vertical direction, $w_h$ is the interval between the reflective units in the lateral direction, $w_v$ is the interval between the reflective units in the vertical direction, $\delta$ is a Dirac delta function, and x and y are the coordinate values of each of the reflective units when the plane on which the reflective units are arranged is represented in a two-dimensional coordinate system.

Furthermore, the eye point spread function may be determined based on the diameter of the pupil, a reference image distance, and an eye relief.

Furthermore, the eye point spread function may be determined by:

$$PSF(x, y) = \frac{1}{\sqrt{2\pi c^2}} e^{-\frac{x^2+y^2}{2c^2}}$$

where c is a blur diameter and is $$c = d_a \frac{|d_o - d_m|}{d_o}.$$

Furthermore, the pre-compensated image information generation unit may generate the pre-compensated image information for augmented reality by the following equation:

Pre-compensated Image Information for Augmented Reality=Original Image Information for Augmented Reality×Compensation Function.

Furthermore, the image compensation device may further include a depth camera configured to measure the reference image distance, and the compensation function determination unit may receive the reference image distance from the depth camera and then calculate the eye point spread function.

Furthermore, the image compensation device may further include an eye tracking device configured to measure the diameter of the pupil and the eye relief, and the compensation function determination unit may receive the diameter of the pupil and the eye relief from the eye tracking device and then calculate the eye point spread function.

Moreover, the compensation function determination unit may receive the relative position information of the pupil from the eye tracking device, may calculate the offset value of the array function of the reflective units, and may determine the array function P(x,y) of the reflective units based on the offset value.

Advantageous Effects

According to the present invention, there may be provided the image compensation device for an image for augmented reality that pre-compensates the luminance distribution information of an image for augmented reality in advance to overcome the problem of a non-uniform luminance distribution in an optical device for augmented reality that provides an image for augmented reality by using a plurality of reflective units, thus being capable of providing an image for augmented reality having a uniform luminance distribution.

DESCRIPTION OF DRAWINGS

FIGS. 2 and 3 are views showing an optical device (200) for augmented reality in which a plurality of reflective units (20) are disposed, in which FIG. 2 is a side view of the optical device (200) for augmented reality and FIG. 3 is a front view of the optical device (200) for augmented reality;

FIG. 4 shows views illustrating a problem in which the luminance distribution of an image for augmented reality observed by a user through the optical device (200) for augmented reality of FIGS. 2 and 3 is non-uniform;

FIG. 12 shows the comparison between an observed image in the case where the image compensation device (300) according to the present invention is applied and an observed image in the case where the image compensation device (300) is not applied.

BEST MODE

Embodiments according to the present invention will be described in detail below with reference to the accompanying drawings.

Figure 5:
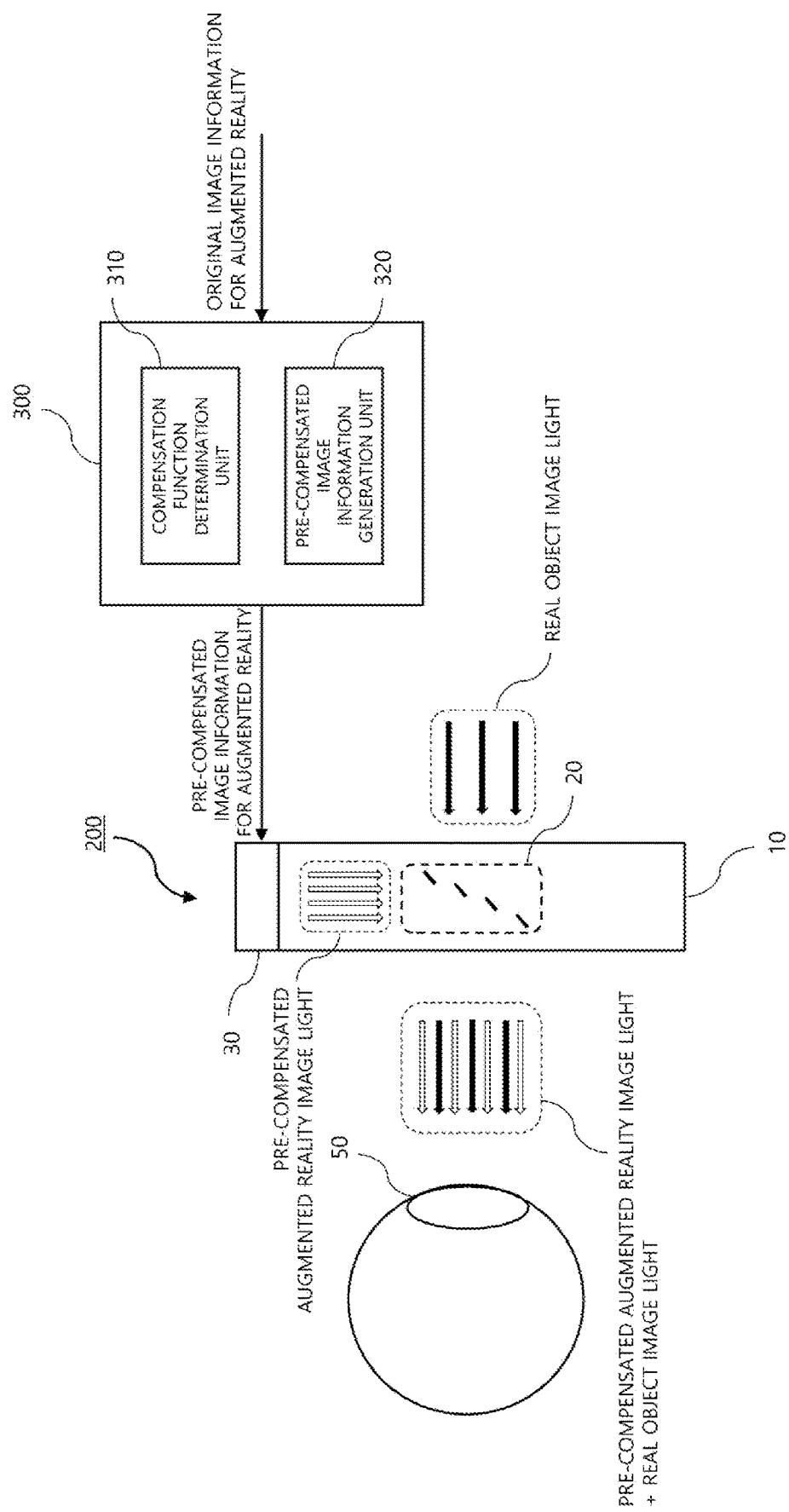
FIG. 5 is a diagram showing an image compensation device (300) for an image for augmented reality and an optical device (200) for augmented reality according to an embodiment of the present invention.

FIG. 5 is a diagram showing an image compensation device 300 for an image for augmented reality and an optical device 200 for augmented reality according to an embodiment of the present invention.

The image compensation apparatus 300 for an image for augmented reality according to the embodiment of FIG. 5 (hereinafter simply referred to as the "image compensation apparatus 300") functions to generate pre-compensated image information for augmented reality based on original image information for augmented reality and to transfer the generated pre-compensated image information for augmented reality to the image output unit 30 of the optical device 200 for augmented reality, thereby enabling a pre-compensated image for augmented reality having a uniform luminance distribution to be provided to a user through the optical device 200 for augmented reality.

The image compensation device 300 includes a compensation function determination unit 310 and a pre-compensated image information generation unit 320, which will be described later. First, the configuration and operation of the optical device 200 for augmented reality, to which the image compensation device 300 according to the present invention is applied, will be schematically described.

Figure 1:
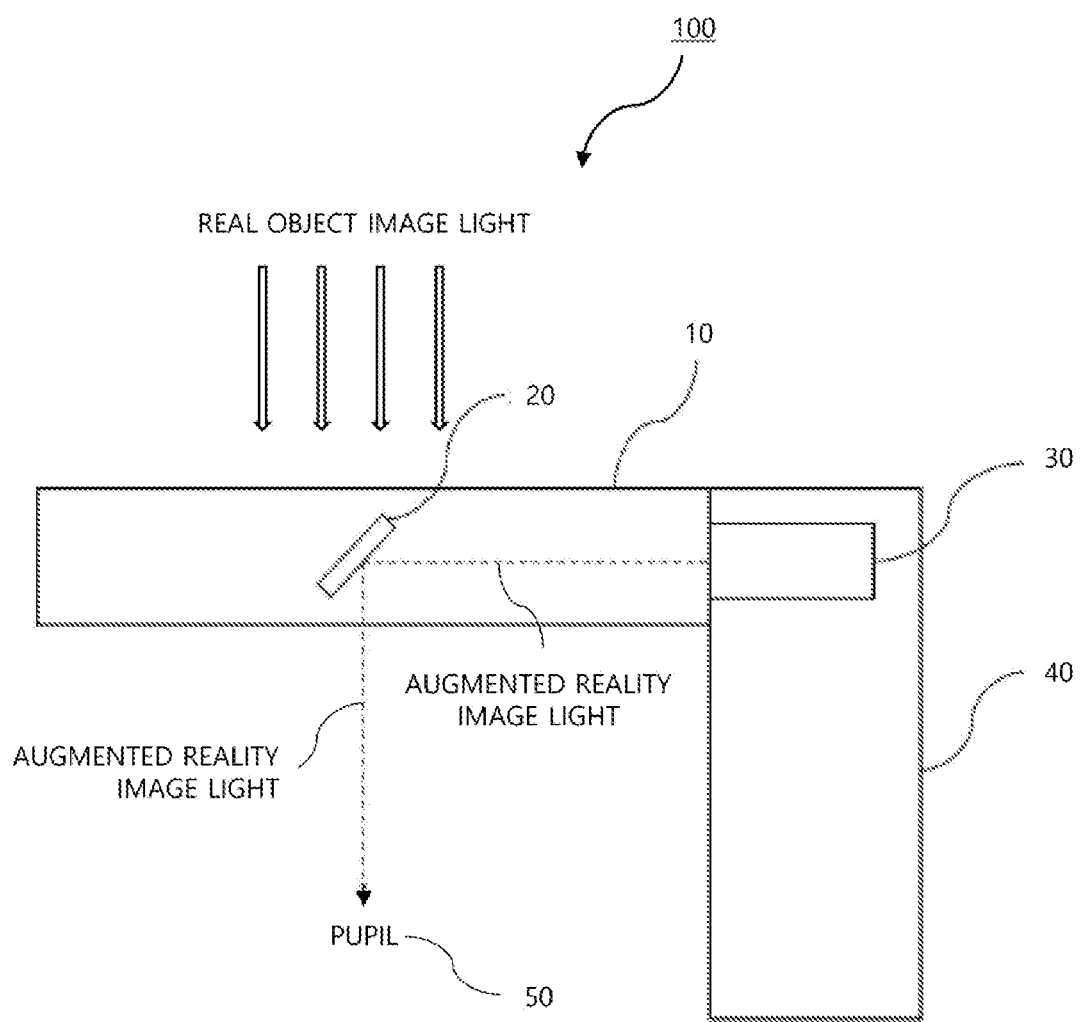
FIG. 1 is a diagram showing an optical device (100) for augmented reality such as that disclosed in patent document 1 that was filed for a patent application by the present applicant.
Figure 2:
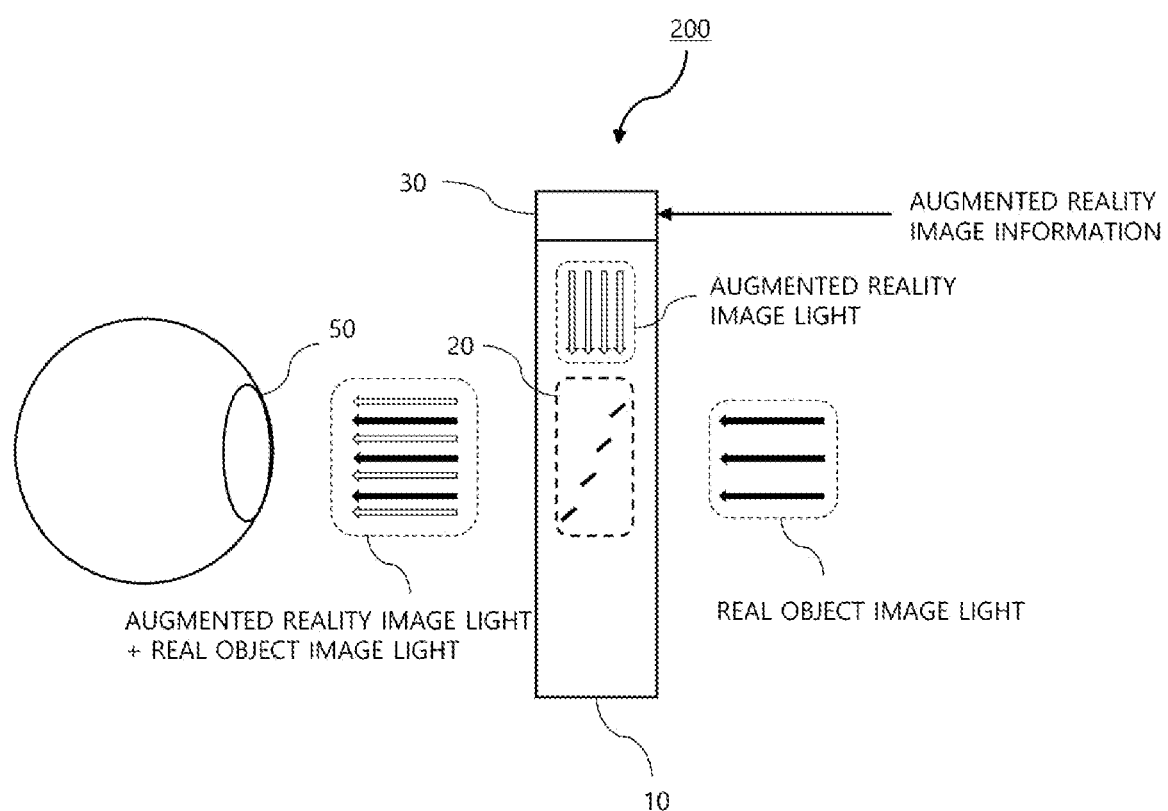
Figure 3:
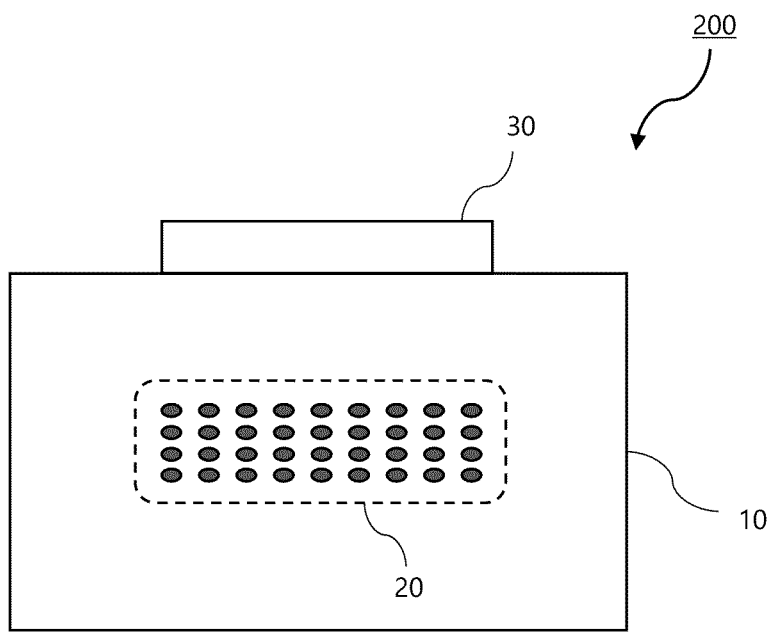

As described with reference to FIGS. 2 and 3 in the background art section, the optical device 200 for augmented reality includes an optical unit 10, a plurality of reflective units 20, and an image output unit 30.

The optical means 10 is a means for transmitting at least part of real object image light, which is image light output from a real object, therethrough toward the pupil 50 of an eye of a user. The plurality of reflective units 20 are means that are disposed inside the optical means 10 and transfer pre-compensated augmented reality image light, output from the image output unit 30, to the pupil 50 of the user by reflecting the pre-compensated augmented reality image light.

In this case, each of the reflective units 20 is formed to have a size smaller than the size of a human pupil, i.e., 8 mm or less, more preferably 4 mm or less, in order to obtain a pinhole effect by increasing the depth of field, as described in the background art section.

The image output unit 30 is a means for receiving pre-compensated image information for augmented reality from the image compensation device 300 and outputting pre-compensated augmented reality image light corresponding thereto. The image output unit 30 may include, e.g., a display device such as a small-sized LCD, and a collimator. Since the image output unit 30 itself is not a direct target of the present invention and is known in the prior art, a detailed description thereof will be omitted.

Although the plurality of reflective units 20 are shown as directly receiving pre-compensated augmented reality image light from the image output unit 30 in FIG. 5, this is illustrative. It is obvious that a configuration may be made such that pre-compensated augmented reality image light from the image output unit 30 is reflected by total internal reflection on the inner surface of the optical unit 10 at least once and transferred to the reflective units 20.

Furthermore, although the plurality of reflective units 20 are arranged such that reflective units 20 constituting lower rows are located closer to the pupil 50 when viewed from a side of the optical means 10 as described above, this is also illustrative. It is obvious that the plurality of reflective units 20 may have a different arrangement structure.

In other words, the optical device 200 for augmented reality to which the image compensation device 300 according to the present invention is applied has no particular limitations on a specific arrangement structure for the reflective units 20 and an optical path between the image output unit 30 and the pupil 50. The image compensation device 300 according to the present invention may be applied to all types of optical devices 200 for augmented reality that transfer augmented reality image light to a user's pupil 50 using a plurality of reflective units 20.

Next, the image compensation device 300 will be described.

The image compensation device 300 includes the compensation function determination unit 310 and the pre-compensated image information generation unit 320.

The compensation function determination unit 310 functions to determine a compensation function for compensating the luminance information of an observed image observed by a user through the optical device 200 for augmented reality when an original image for augmented reality is output from the image output unit 30. The pre-compensated image information generation unit 320 functions to generate pre-compensated image information for augmented reality based on the compensation function determined by the compensation function determination unit 310.

First, the compensation function determination unit 310 receives original image information for augmented reality from an image playback device (not shown) included in a device such as a computer or smartphone, determines a compensation function for compensating the luminance information of an observed image observed by a user when an original image for augmented reality is output through the image output unit 30 based on the original image information for augmented reality, and transfers the compensation function to the pre-compensated image information generation unit 320.

In this case, the image information for augmented reality is information that allows an image for augmented reality to be output from the image output unit 30 as image light for augmented reality. The image information for augmented reality refers to information for displaying an image for augmented reality on a display unit (not shown) included in the image output unit 30.

In general, the information for displaying an image on a display unit is composed of m×n×3 three-dimensional arrays each consisting of intensity values for respective colors R (red), G (green), and B (blue) of each pixel when a corresponding image is composed of m×n pixels. In this case, the intensity values for respective colors R (red), G (green), and B (blue) of each pixel correspond to respective luminance values for respective colors R, G, and B of the corresponding pixel. The intensity values are usually represented in 8 bits to have values in the range of 0 to 255, and may have 256×256×256 combinations through the combination for the individual colors.

For an image for augmented reality to be displayed on the display unit included in the image output unit 30, the image information for augmented reality is also composed of m×n×3 three-dimensional arrays each consisting of intensity values for respective colors R, G, and B for each pixel when the corresponding image for augmented reality is composed of m×n pixels. These arrays may be represented by matrices.

Meanwhile, in the present invention, the "original" image information for augmented reality refers to image information about an image for augmented reality in the state in which luminance information is not compensated by the image compensation device 300 according to the present invention. The "pre-compensated" image information for augmented reality refers to image information about a pre-compensated image for augmented reality having luminance information compensated by the image compensation device 300 according to the present invention.

The compensation function for compensating the luminance information of an observed image observed by a user when an original image for augmented reality is output through the image output unit 30 may be determined by the following equation:

$$\text{Compensation function} = \frac{\alpha}{M(x, y) * P(x, y) * PSF(x, y)}$$

In this equation, $\alpha$ is a scaling factor which is a value for normalizing the luminance of the pre-compensated image for augmented reality in accordance with a range that can be displayed by the display unit of the image output unit 30 when the luminance of the pre-compensated image for augmented reality exceeds the range that can be displayed by the display unit of the image output unit 30. This may vary depending on the maximum value of the pre-compensated image for augmented reality.

Furthermore, $M(x,y)$ is the shape function of the reflective units 20, $P(x,y)$ is the array function of the reflective units 20, $PSF(x,y)$ is an eye point spread function (PSF), and * is a convolution operator.

In addition, x and y refer to the coordinate values of the x- and y-axes when the plane on which the reflective units 20 are arranged or the retina is represented in a two-dimensional coordinate system.

The shape function $M(x,y)$ of the reflective units 20 is a function that mathematically represents the shape of the reflective units 20. For example, when the reflective units 20 are circular, the shape function $M(x,y)$ may be defined as follows:

$$M(x, y) = \text{Circ}\left(\frac{\sqrt{x^2 + y^2}}{r}\right)$$

where x and y refer to coordinate values when the plane on which the reflective units 20 are arranged or the retina is represented in a two-dimensional coordinate system, and r is the radius of the reflective units 20.

Furthermore, $$\text{Circ}\left(\frac{x^2 + y^2}{r}\right)$$

is 1 when it is smaller than r, and has 0 otherwise.

The array function $P(x,y)$ of the reflective units 20 is a function that describes the arrangement structure of the reflective units 20 in the plane on which the reflective units 20 are arranged, and is a function that represents the positions of the centers of the reflective units 20 in the two-dimensional coordinate system of the plane on which the reflective units 20 are arranged.

For example, assuming that the plurality of reflective units 20 are in the form of a two-dimensional grid, the array function of the reflective units 20 representing the positions of the centers of the plurality of reflective units 20 may be defined as follows:

$$P(x, y) = \sum_{j=0}^{h-1} \sum_{i=0}^{w-1} \delta(x - w_h i, y - w_v j)$$

In this equation, h is the number of reflective units 20 in the lateral direction, w is the number of reflective units 20 in the vertical direction, $w_h$ is the interval between the reflective units 20 in the lateral direction, $w_v$ is the interval between the reflective units 20 in the vertical direction, and $\delta$ is a Dirac delta function. Furthermore, x and y are the coordinate values of each of the reflective units 20 when the plane on which the reflective units 20 are arranged is represented in a two-dimensional coordinate system.

Figure 6:
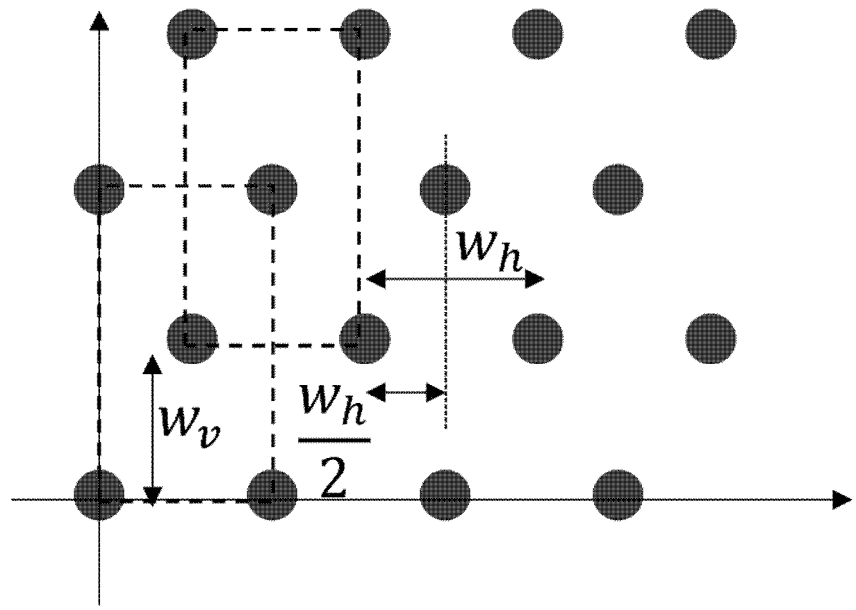
FIG. 6 shows another example of the array function of reflective units (20)

FIG. 6 shows another example of the array function of the reflective units 20.

Referring to FIG. 6, the plurality of reflective units 20 are arranged in the form of a hexagonal two-dimensional grid, in which individual rows are spaced apart from each other by $w_v$ and individual columns are spaced apart from each other by $w_h/2$.

In this case, the array function of the reflective units 20 may be defined as follows:

$$P(x, y) = \sum_{j=0}^{\frac{h-1}{2}} \sum_{i=0}^{w-1} \delta(x - w_h i, y - 2w_v j) +$$

$$\sum_{j=0}^{\frac{h-1}{2}} \sum_{i=0}^{w-1} \delta\left(x - w_h i - \frac{w_h}{2}, y - 2w_v j - w_v\right)$$

In the above equation, the sigma operation on the left represents the arrangement of the reflective units 20 in odd-numbered columns from the left, and the sigma operation on the right represents the arrangement of the reflective units 20 in even-numbered columns.

In this equation, h is the number of reflective units 20 in the lateral direction, w is the number of reflective units 20 in the vertical direction, $w_h$ is the interval between the reflective units 20 in the lateral direction, $w_v$ is the interval between the reflective units 20 in the vertical direction, and $\delta$ is a Dirac delta function. Furthermore, x and y are the coordinate values of each of the reflective units 20 when the plane on which the reflective units 20 are arranged is represented in a two-dimensional coordinate system.

The eye point spread function $PSF(x,y)$ is the two-dimensional spatial distribution function (on the retinal surface) of the intensity values of an image formed on the retina when a point light source at a distance $d_m$ away from the pupil 50 is observed.

Figure 7:
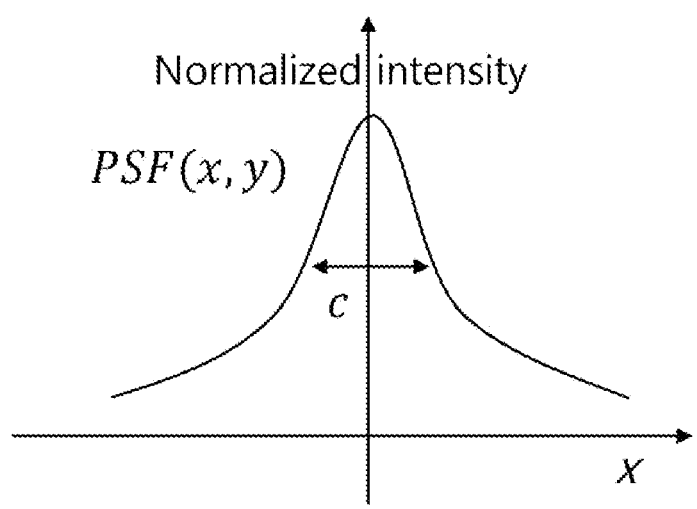
FIG. 7 is a diagram showing an example of an eye point spread function.

FIG. 7 is a diagram showing an example of an eye point spread function.

The eye point spread function of FIG. 7 may be defined by the Gaussian distribution below:

$$PSF(x, y) = \frac{1}{\sqrt{2\pi c^2}} e^{-\frac{x^2 + y^2}{2c^2}}$$

where c is a blur diameter, and is defined as $$c = d_a \frac{|d_o - d_m|}{d_o}.$$

Furthermore, $d_a$ is the diameter of the pupil 50, $d_o$ is a reference image distance (a focal position for an object included in an image for augmented reality), $d_m$ is an eye relief (the distance between the pupil 50 and the reflective units 20, and x and y refer to coordinate values when the retina is represented in a two-dimensional coordinate system.

Figure 8:
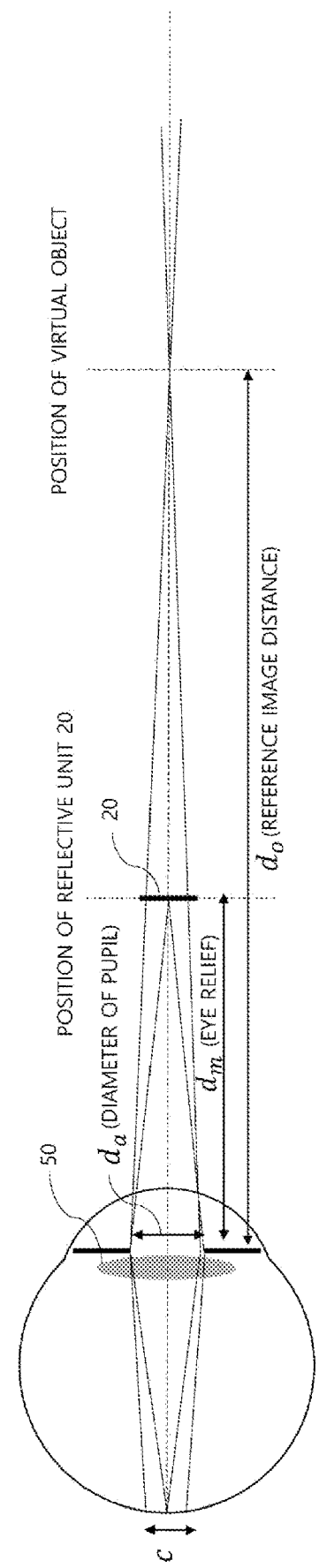
FIG. 8 is a diagram illustrating c, $d_a$, $d_o$, and $d_m$ of the eye point spread function.

FIG. 8 is a diagram illustrating c, $d_a$, $d_o$, and $d_m$ of the eye point spread function.

Referring to FIG. 8, $d_a$ is the diameter of the pupil 50, and $d_m$ is an eye relief (the distance from the pupil 50 to the reflective units 20.

Furthermore, $d_o$ is a reference image distance, and refers to the distance between a focal position, which is the position of a virtual object, i.e., an object included in an image for augmented reality, and the pupil 50.

Meanwhile, c is a blur diameter, and refers to the diameter of a circle of confusion in which one point light source is blurred when the point light source is projected onto the retina through the reflective units 20.

The equation $$c = d_a \frac{|d_o - d_m|}{d_o}$$

may be derived by the proportional expression between the triangles shown in FIG. 8.

Figure 9:
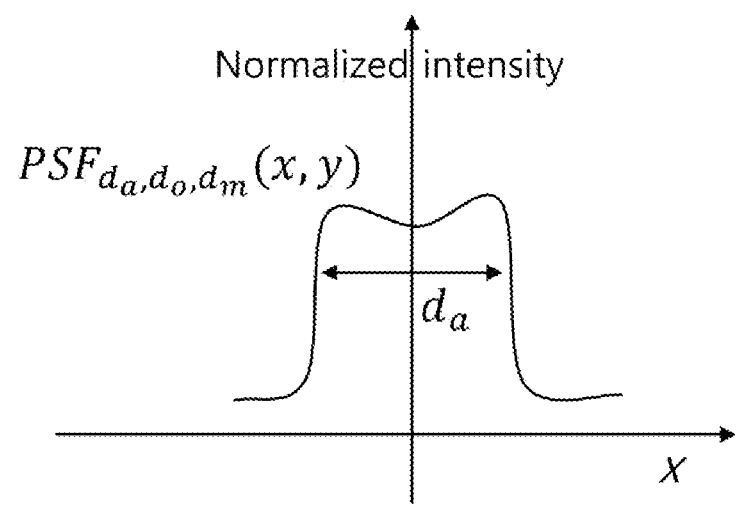
FIG. 9 shows another example of the eye point spread function.

FIG. 9 shows another example of the eye point spread function.

From the eye point spread function of FIG. 9, it can be seen that there is a distribution in which luminance is highest at a position corresponding to the radius of the pupil 50 from the origin, and luminance at a position corresponding to the center of the pupil 50 is slightly low, and luminance rapidly decreases outside the radius of the pupil 50.

The eye point spread function of FIG. 9 may be generalized and represented as and by $PSF_{d_a, d_o, d_m}(x,y)$, in which case $d_a$, $d_o$, and $d_m$ used as subscripts imply that the eye point spread function varies depending on these values.

This eye point spread function is a function determined by the characteristics of a human's eyeball. The detailed shape of an individual eye point spread function may vary depending on visual acuity, age, eye condition, and/or the like for each person, and generally takes the form of a concentric circle having a bright center. Although an individual eye point spread function varies depending on the diameter of the pupil, a reference image distance, and/or an eye relief, it has the same value under the same conditions.

Meanwhile, it should be noted that although the eye point spread function is represented by a one-dimensional function in FIGS. 7 and 9 for ease of description, it is a distribution function based on the retinal plane in reality, so that the eye point spread function is a two-dimensional function that varies depending on the position (x,y) of the retina.

In addition, the eye point spread functions shown in FIGS. 7 and 9 are illustrative, and it is obvious that another eye point spread function may also be used.

The compensation function may be determined by the shape function M(x,y) of the reflective units 20, the array function P(x,y) of the reflective units 20, the eye point spread function PSF(x,y), and the scaling factor α, which is based on the following principle.

The observed image observed by the user is an image that is formed in such a manner that an image for augmented reality output from the image output unit 30 is projected onto the retina through the pupil 50 after having been reflected by the reflective units 20. Accordingly, the luminance of the observed image observed by the user may be represented by a result obtained by multiplying the convolution operation of the shape function M(x,y) of the reflective units 20, the array function P(x,y) of the reflective units 20, and the eye point spread function PSF(x,y) by the original image for augmented reality.

Figure 10:
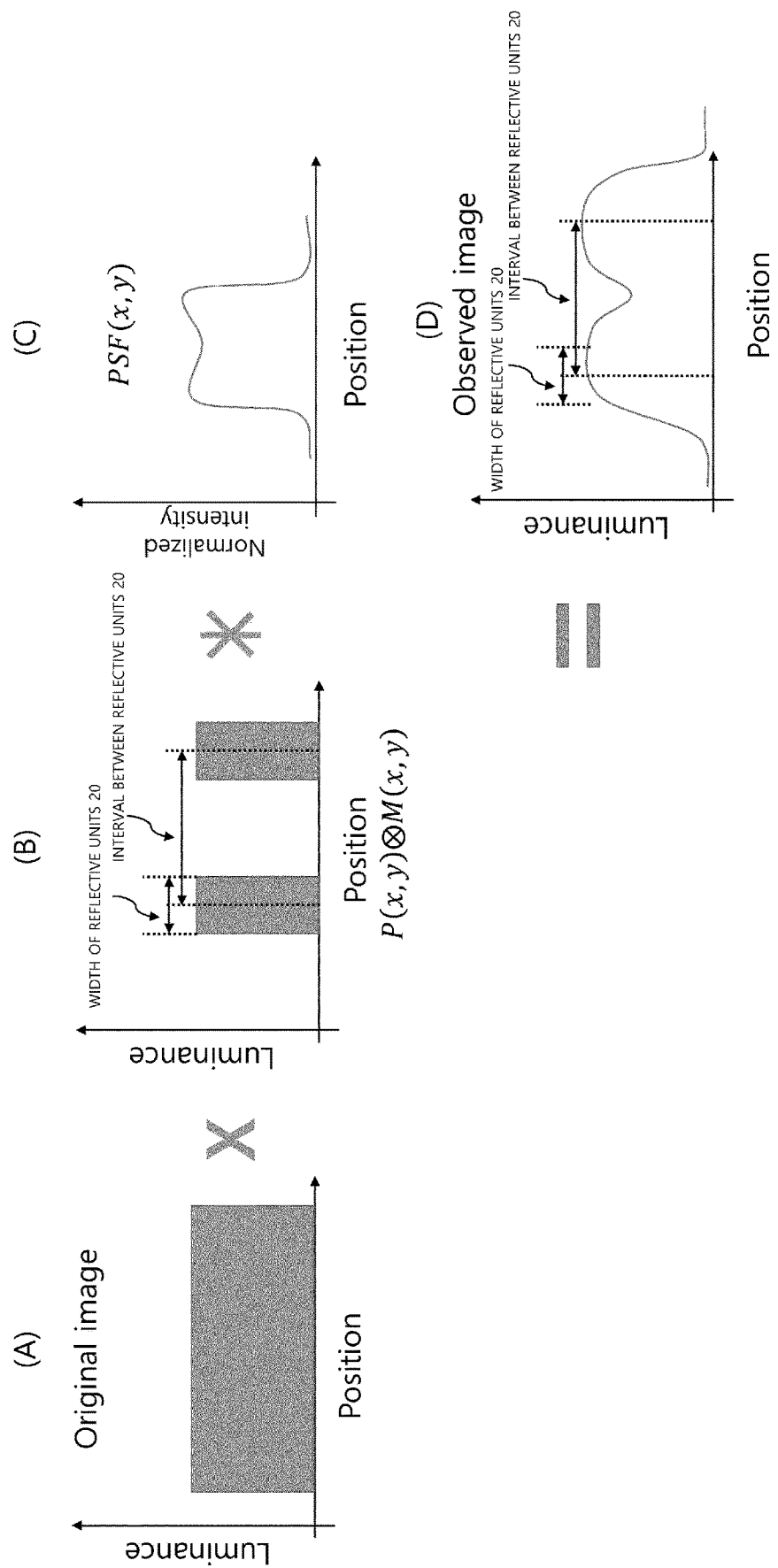
FIG. 10 shows a principle in which the luminance distribution of an observed image observed by a user is represented by the convolution operation of the shape function of the reflective units (20), the array function of the reflective units (20), and an eye point spread function.

FIG. 10 shows a principle in which the luminance distribution of an observed image observed by a user is represented by the convolution operation of the shape function of the reflective units 20, the array function of the reflective units 20, and an eye point spread function.

Assuming that an original image has the same luminance distribution regardless of the position as shown in FIG. 10(A), the reflective units 20 are arranged to have the width at the intervals as shown in FIG. 10(B), and the eye point spread function is applied as shown in FIG. 10(C), it can be seen that the luminance of an observed image finally observed by a user may be represented by a result obtained by multiplying the result of the convolution operation of the shape function M(x,y) of the reflective units 20, the array function P(x,y) of the reflective units 20, and the eye point spread function PSF(x,y) by the original image.

In this case, multiplying the result of the convolution operation of the shape function of the reflective units 20, the array function of the reflective units 20, and the eye point spread function by the original image means that when the original image is composed of m×n pixels, m×n×3 pixel matrices each consisting of intensity values for respective colors R, G, and B of each pixel is multiplied by the result of M(x,y)*P(x,y)*PSF(x,y) for each component of the matrices, as described above.

In other words, the luminance distribution of the observed image may be obtained by the following equation:

Luminance Distribution of the Observed
Image=Orignal Image×M(x,y)*P(x,y)*PSF(x,y)

Meanwhile, it can be seen that the final observed image shown in FIG. 10(D) exhibits a luminance distribution that is not uniform depending on the position according to the result of the convolution operation, i.e., M(x,y)*P(x,y)*PSF(x,y), in FIGS. 10(B) and 10(C), unlike in the case where the luminance distribution of the original image is uniform in FIG. 10(A).

Based on this principle, when image information for augmented reality transferred to the image output unit 30 can be pre-compensated in order to make the luminance distribution of a final observed image uniform, a final observed image having a uniform luminance distribution may be obtained.

Figure 11:
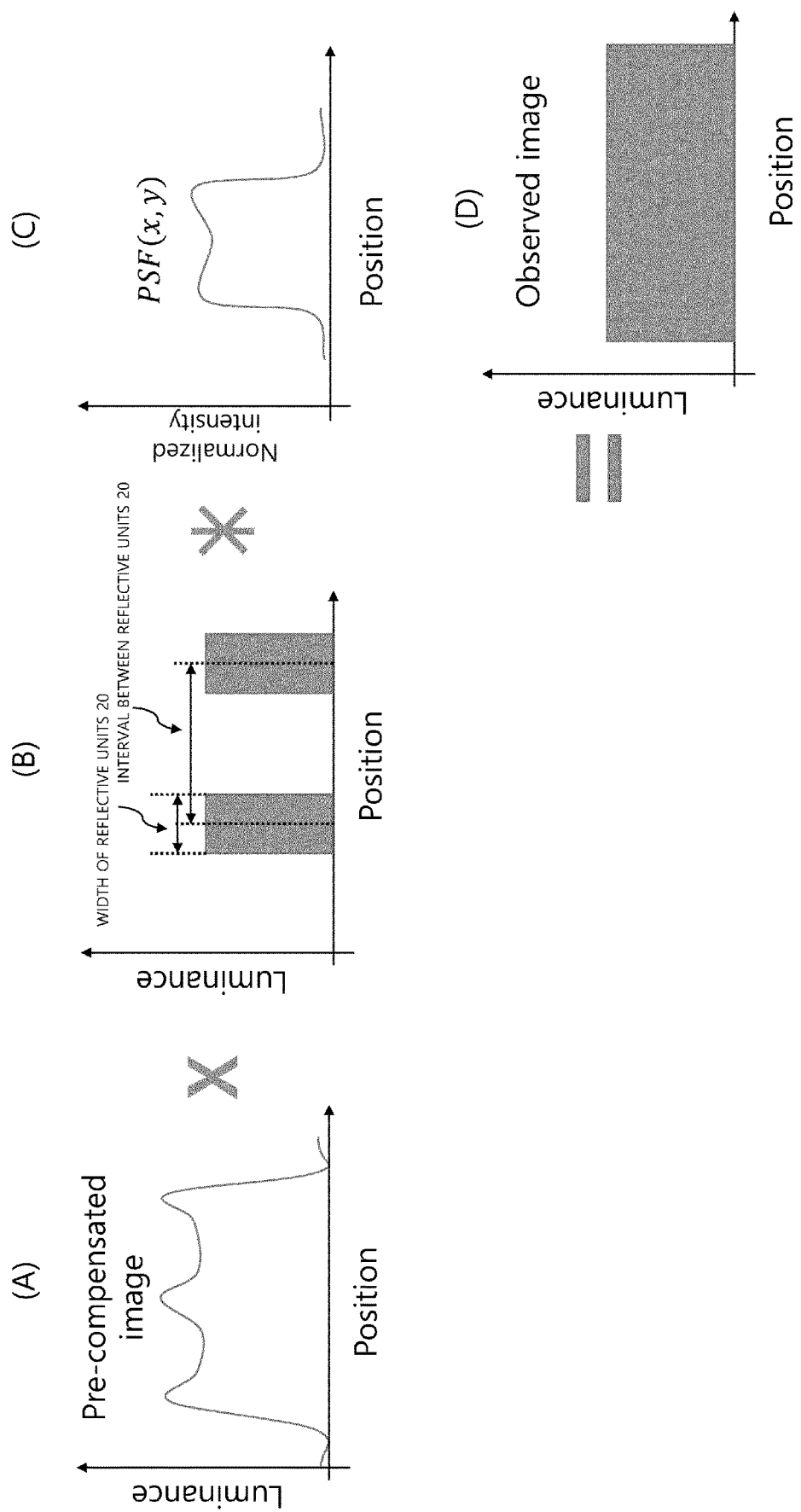
FIG. 11 is intended to illustrate the principle of the present invention in which an observed image having a uniform luminance distribution can be acquired by pre-compensating an observed image observed by a user.

FIG. 11 is intended to illustrate the principle of the present invention in which an observed image having a uniform luminance distribution can be acquired by pre-compensating an observed image observed by a user.

FIGS. 11(B) and 11(C) are the same as FIGS. 10(B) and 10(C), but FIG. 11 is different from FIG. 10 in that a pre-compensated image having the luminance distribution shown in FIG. 11(A) is input instead of an original image.

As described in FIG. 10, the luminance distribution of an observed image may be acquired by a pre-compensated image×M(x,y)*P(x,y)*PSF(x,y), so that a final observed image for a pre-compensated image having the luminance distribution shown in FIG. 11(A) has a uniform luminance distribution, as shown in FIG. 11(D).

Based on this principle, the compensation function determination unit 310 determines a compensation function by the formula $$\frac{\alpha}{M(x, y) * P(x, y) * PSF(x, y)}.$$

Meanwhile, the shape and arrangement of the reflective units 20 are predetermined when the optical device 200 for augmented reality is manufactured, so that the shape function and array function of the reflective units 20 are values known in advance. Furthermore, in the eye point spread function, $d_o$ and $d_m$ exclusive of $d_a$, i.e., the diameter of the pupil 50, are values that are preset upon design of the optical device 200 for augmented reality and are not particularly changed.

Accordingly, the compensation function may be calculated by measuring only the diameter of the pupil 50 of the user of the optical device 200 for augmented reality.

The diameter of the pupil 50 of the user varies depending on the depth information of a main object included and displayed in an image for augmented reality, the luminance information of an original image for augmented reality, and/or the like. The depth information of the main object and the luminance information of the original image for augmented reality are also values known in advance. Accordingly, when the average values of the diameters of the pupils 50 of users corresponding to such values are experimentally obtained in advance, the compensation function may be easily obtained.

Next, the pre-compensated image information generation unit 320 will be described.

The pre-compensated image information generation unit 320 functions to generate pre-compensated image information for augmented reality based on the compensation function determined by the compensation function determination unit 310 and original image information for augmented reality and to transfer the pre-compensated image information for augmented reality to the image output unit 30.

In this case, the pre-compensated image information for augmented reality may be obtained by the following equation:

Pre-compensated Image Information for Augmented Reality=Original Image Information for Augmented Reality×Compensation Function This means that when an original image for augmented reality is composed of m×n pixels, m×n×3 pixel matrices each consisting of intensity values for respective colors R, G, and B of each pixel are multiplied by a compensation function for each component of the matrices, as described above.

The luminance distribution of a pre-compensated image for augmented reality based on the pre-compensated image information for augmented reality generated as described above is shown in FIG. 11(A).

The image output unit 30 having received the pre-compensated image information for augmented reality outputs pre-compensated augmented reality image light corresponding thereto, and the reflective units 20 transfers the pre-compensated augmented reality image light to the pupil 50 by reflecting the pre-compensated augmented reality image light, thereby providing a pre-compensated image for augmented reality to a user. This corresponds to the convolution operation of the shape function of the reflective units 20, the array function of the reflective units 20, and the eye point spread function as shown in FIGS. 11(B) and 11(C). Accordingly, the pre-compensated image for augmented reality finally observed by the user has a uniform luminance distribution as shown in FIG. 11(D).

FIG. 12 shows the comparison between an observed image in the case where the image compensation device 300 according to the present invention is applied and an observed image in the case where the image compensation device 300 is not applied.

In FIG. 12, FIG. 12(A) shows the state in which an original image for augmented reality is displayed on the image output unit 30, and FIG. 12(B) shows an observed image that is observed by a user when an original image for augmented reality is transferred to the pupil 50 through the optical device 200 for augmented reality without the application of the image compensation device 300. It can be seen that this has a non-uniform luminance distribution as described above in conjunction with FIGS. 4 and 10(D).

Meanwhile, FIG. 12(C) shows the state in which pre-compensated image for augmented reality corresponding to the pre-compensated image information for augmented reality generated by the image correcting device 300 as described above is displayed on the image output device 30. FIG. 12(D) shows a final observed image that is observed by the user when the pre-compensated image for augmented reality is transferred to the pupil 50 through the optical device 200 for augmented reality. As shown in FIG. 12(D), it can be seen that the observed image for the pre-compensated image for augmented reality having the luminance information pre-compensated by the image compensation device 300 has a uniform luminance distribution. Accordingly, the user may be provided with a clearer, sharper image for augmented reality than in the case of FIG. 12(B).

Meanwhile, as described above, the eye point spread function varies depending on the diameter $d_a$ of the pupil 50, the eye relief $d_m$, and the reference image distance $d_o$. In this case, when the reference image distance $d_o$ varies, the distance between the position of a virtual object and the pupil 50 may be dynamically measured using a depth camera in order to measure the variation of the reference image distance $d_o$.

Furthermore, when an eye tracking device is employed, the diameter $d_a$ of the pupil 50 and the eye relief $d_m$ may be dynamically measured.

Furthermore, although the array function P(x,y) of the reflective units 20 has been described for the fixed position of the pupil 50 in the above embodiment, an offset may occur in the array function P(x,y) of the reflective units 20 when the position of the pupil 50 is moved. In this case, when an eye tracking device is employed, the relative position of the pupil 50 may be known in real time, so that the offset of the array function P(x,y) of the reflective units 20 may be compensated for. This may be applied to all the array functions P(x,y) of any types of reflective units 20.

In this case, the array function of the reflective units 20 representing the positions of the centers of the reflective units 20 discussed above may be modified as follows:

$$P(x, y) = \sum_{j=0}^{h-1} \sum_{i=0}^{w-1} \delta(x - w_h i + x_0, y - w_v j + y_0)$$

where $x_0$ and $y_0$ are offset values in the x-axis and y-axis directions, respectively.

In addition, when the depth camera and the eye tracking device are used together, the diameter $d_a$ of the pupil 50, the eye relief $d_m$, the reference image distance $d_o$, and the relative position of the pupil 50 may all be measured in real time.

Accordingly, the present invention may be easily applied, for example, even to a case where the image for augmented reality is a moving image and the reference video distance changes and a case where the diameter of the pupil frequently changes due to changes in luminance.

Since the depth cameras and the eye tracking device are known in the prior art, detailed descriptions thereof will be omitted.

Although the present invention has been described with reference to the preferred embodiments according to the present invention, the present invention is not limited to the above-described embodiments, and it is obvious that various modifications and alterations are possible.

The invention claimed is:

1. An image compensation device for an image for augmented reality, the image compensation device being combined with an optical device for augmented reality that includes an image output unit configured to output augmented reality image light corresponding to an image for augmented reality, the image compensation device comprising:
a compensation function determination unit configured to determine a compensation function for compensating luminance information of an observed image observed by a user through the optical device for augmented reality when an original image for augmented reality is output from the image output unit; and
a pre-compensated image information generation unit configured to generate pre-compensated image information for augmented reality based on the compensation function determined by the compensation function determination unit and original image information for augmented reality;
wherein the image output unit outputs pre-compensated augmented reality image light corresponding to the pre-compensated image information for augmented reality generated by the pre-compensated image information generation unit, and the pre-compensated augmented reality image light is transferred to a pupil of the user through the optical device for augmented reality.

2. The image compensation device of claim 1, wherein the optical device for augmented reality includes a plurality of reflective units configured to transfer the pre-compensated augmented reality image light, output from the image output unit, to the pupil of the user by reflecting the pre-compensated augmented reality image light.

3. The image compensation device of claim 2, the compensation function determination unit determines the compensation function based on a shape of the reflective units, an arrangement of the reflective units and an eye point spread function (PSF).

4. The image compensation device of claim 3, wherein the compensation function determination unit determines the compensation function by a formula below:

$$\frac{\alpha}{M(x, y) * P(x, y) * PSF(x, y)}$$

where $\alpha$ is a scaling factor, $M(x,y)$ is a shape function of the reflective units, $P(x,y)$ is an array function of the reflective units, $PSF(x,y)$ is an eye point spread function (PSF), and * is a convolution operator.

5. The image compensation device of claim 4, wherein the shape function $M(x,y)$ of the reflective units is determined by:

$$M(x, y) = Circ\left(\frac{\sqrt{x^2 + y^2}}{r}\right)$$

where x and Y refer to coordinate values when a plane on which the reflective units are arranged or a retina is represented in a two-dimensional coordinate system, r is a radius of the reflective units, and $$Circ\left(\frac{x^2 + y^2}{r}\right)$$

is 1 when it is smaller than r, and has 0 otherwise.

6. The image compensation device of claim 4, wherein the array function $P(x,y)$ of the reflective units is a function representing positions of centers of the plurality of reflective units.

7. The image compensation device of claim 6, wherein the array function (x,y) of the reflective units is determined by an equation below:

$$P(x, y) = \sum_{j=0}^{h-1} \sum_{i=0}^{w-1} \delta(x - w_h i, y - w_v j)$$

where h it is a number of reflective units in a lateral direction, w is a number of reflective units in a vertical direction, $w_n$ is an interval between the reflective units in the lateral direction, $w_v$ is an interval between the reflective units in the vertical direction, $\delta$ is a Dirac delta function, and X and Y are coordinate values of each of the reflective units when a plane on which the reflective units are arranged is represented in a two-dimensional coordinate system.

8. The image compensation device of claim 6, wherein the array function (x,y) of the reflective units is determined by an equation below:

$$P(x, y) = \sum_{j=0}^{\frac{h-1}{2}} \sum_{i=0}^{w-1} \delta(x - w_h i, y - 2w_v j) + \sum_{j=0}^{\frac{h-1}{2}} \sum_{i=0}^{w-1} \delta\left(x - w_h i - \frac{w_h}{2}, y - 2w_v j - w_v\right)$$

where h is a number of reflective units in a lateral direction, w is a number of reflective units in a vertical direction, $w_h$ is an interval between the reflective units in the lateral direction, $w_v$ is an interval between the reflective units in the vertical direction, $\delta$ is a Dirac delta function, and X and Y are coordinate values of each of the reflective units when a plane on which the reflective units are arranged is represented in a two-dimensional coordinate system.

9. The image compensation device of claim 3, wherein the eye point spread function is determined based on a diameter of the pupil, a reference image distance, and an eye relief.

10. The image compensation device of claim 9, further comprising a depth camera configured to measure the reference image distance,
wherein the compensation function determination unit receives the reference image distance from the depth camera and then calculates the eye point spread function.

11. The image compensation device of claim 10, further comprising an eye tracking device configured to measure the diameter of the pupil and the eye relief, wherein the compensation function determination unit receives the diameter of the pupil and the eye relief from the eye tracking device and then calculates the eye point spread function.

12. The image compensation device of claim 11, wherein the compensation function determination unit receives relative position information of the pupil from the eye tracking device, calculates an offset value of the array function of the reflective units, and determines the array function P(x,y) of the reflective units based on the offset value.

13. The image compensation device of claim 9, further comprising an eye tracking device configured to measure the diameter of the pupil and the eye relief,
wherein the compensation function determination unit receives the diameter of the pupil and the eye relief from the eye tracking device and then calculates the eye point spread function.

14. The image compensation device of claim 13, wherein the compensation function determination unit receives relative position information of the pupil from the eye tracking device, calculates an offset value of the array function of the reflective units, and determines the array function (x,y) of the reflective units based on the offset value.

15. The image compensation device of claim 3, wherein the eye point spread function is determined by:

$$PSF(x, y) = \frac{1}{\sqrt{2\pi c^2}} e^{-\frac{x^2+y^2}{2c^2}}$$

where c is a blur diameter and is $$c = d_a \frac{|d_o - d_m|}{d_o}.$$

16. The image compensation device of claim 1, wherein the pre-compensated image information generation unit generates the pre-compensated image information for augmented reality by an equation below:

Pre-compensated Image Information for Augmented Reality=Original Image Information for Augmented Reality×Compensation Function.

17. An image compensation device for an image for augmented reality, the image compensation device being combined with an optical device for augmented reality that includes an image output unit configured to output augmented reality image light corresponding to an image for augmented reality, the image compensation device comprising:
a compensation function determination unit configured to determine a compensation function for compensating luminance information of an observed image observed by a user through the optical device for augmented reality when an original image for augmented reality is output from the image output unit; and
a pre-compensated image information generation unit configured to generate pre-compensated image information for augmented reality based on the compensation function determined by the compensation function determination unit and original image information for augmented reality;
wherein the image output unit outputs pre-compensated augmented reality image light corresponding to the pre-compensated image information for augmented reality generated by the pre-compensated image information generation unit, and the pre-compensated augmented reality image light is transferred to a pupil of the user through the optical device for augmented reality;
wherein the optical device for augmented reality includes a plurality of reflective units configured to transfer the pre-compensated augmented reality image light, output from the image output unit, to the pupil of the user by reflecting the pre-compensated augmented reality image light;
wherein the compensation function determination unit determines the compensation function based on a shape of the reflective units, an arrangement of the reflective units and an eye point spread function (PSF); and
wherein the eye point spread function PSF(x,y) is a two-dimensional spatial distribution function of intensity values of an image formed on a retina when a point light source at a predetermined distance away from the user's pupil is observed.

* * * * *